United States Patent [19]
Schotthoefer

[11] Patent Number: 5,836,182
[45] Date of Patent: *Nov. 17, 1998

[54] SPARE TIRE LOCKING DEVICE

[75] Inventor: Gerald R. Schotthoefer, Dallas, Tex.

[73] Assignee: Adell Corporation, Sunnyvale, Tex.

[ * ] Notice: The term of this patent shall not extend beyond the expiration date of Pat. No. 5,638,711.

[21] Appl. No.: 896,820

[22] Filed: Jul. 18, 1997

[51] Int. Cl.⁶ .............................. B62D 43/04; E05B 65/12
[52] U.S. Cl. ......................... 70/259; 224/42.23; 414/463; 293/117
[58] Field of Search ............................ 293/117; 414/463, 414/466; 224/42.21, 42.23, 42.25; 70/259, 260

[56] References Cited

U.S. PATENT DOCUMENTS

| | | |
|---|---|---|
| 4,526,021 | 7/1985 | Princell . |
| 4,988,023 | 1/1991 | Heathcoat . |
| 5,077,995 | 1/1992 | Appelbaum . |
| 5,199,287 | 4/1993 | McClary . |
| 5,330,313 | 7/1994 | Easterwood . |
| 5,343,722 | 9/1994 | Richardson . |
| 5,638,711 | 6/1997 | Schotthoefer . |
| 5,681,137 | 10/1997 | Stallings ................................ 414/463 |

Primary Examiner—Darnell M. Boucher
Attorney, Agent, or Firm—H. Dennis Kelly; W. Thomas Timmons; Timmons & Kelly

[57] ABSTRACT

A spare tire is mounted on a hoist having a hoist shaft. A rear bumper has a vertical portion with a hole providing access to the hoist shaft, a horizontal portion attached to the vertical portion and extending forward, and a lip extending downward from the horizontal portion, wherein the lip of the bumper has a arcuate notch aligned with the hole in the vertical portion of the bumper and the hoist shaft. A forward connector is attached to the forward end of a winch tube cover and adapted to cover one end of the hoist shaft, and has an open bore to provide access to the hoist shaft. A rear connector is attached to the rearward end of the winch tube cover and adapted to extend through the opening in the rear bumper, and has an open bore to provide access to the hoist shaft. A lock is temporary attached to the rear connector to prevent access to the hoist shaft through the rear connector.

5 Claims, 4 Drawing Sheets

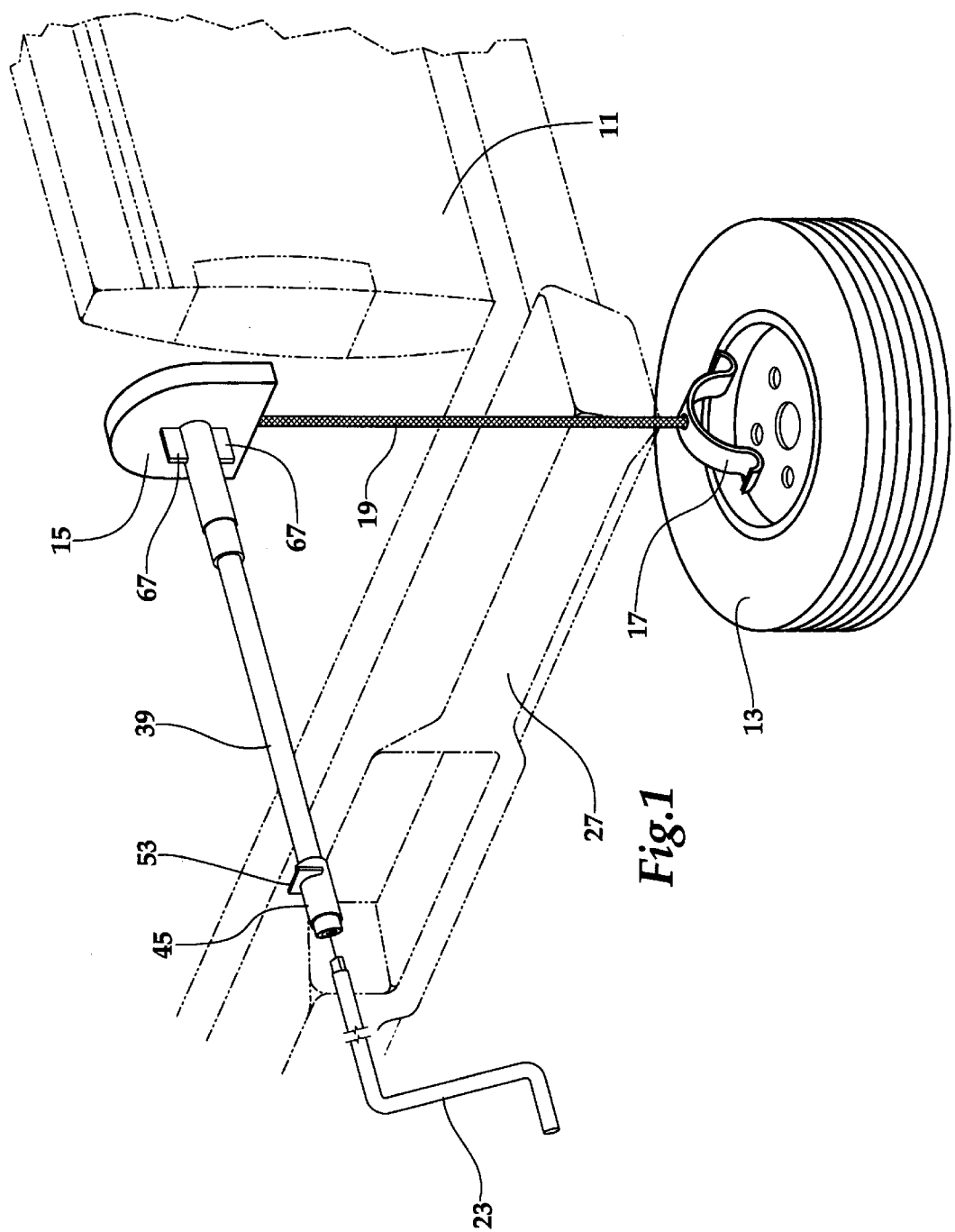

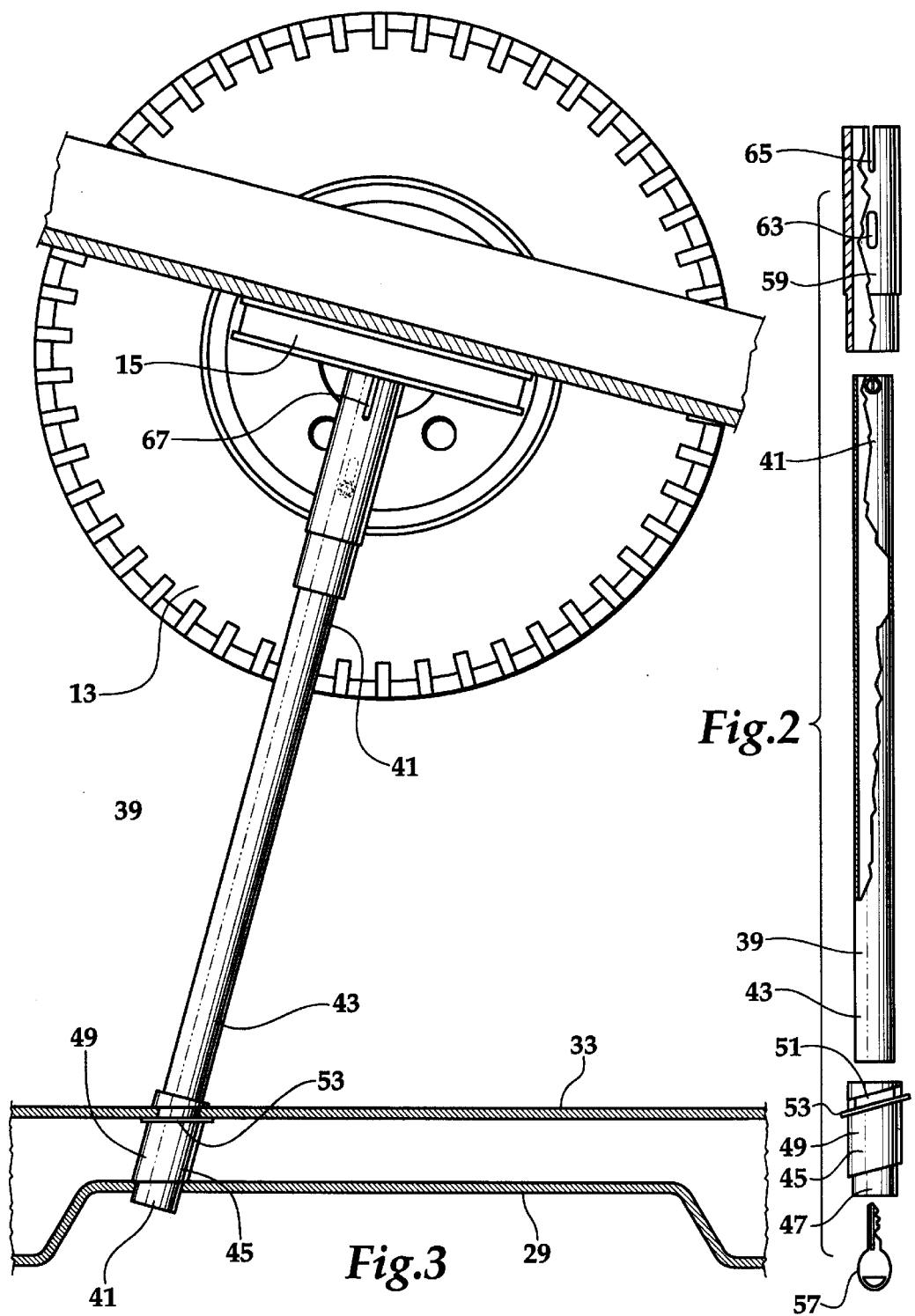

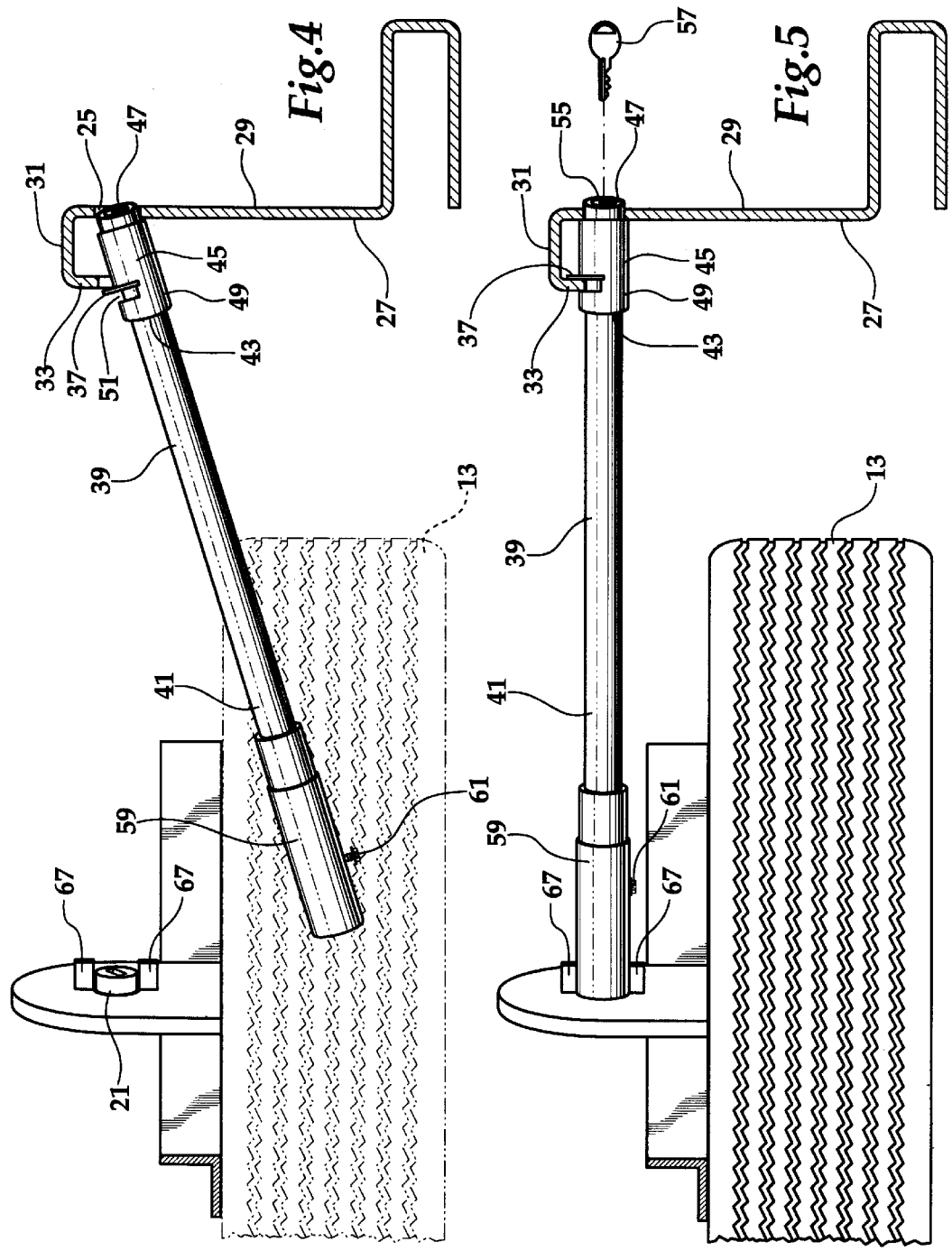

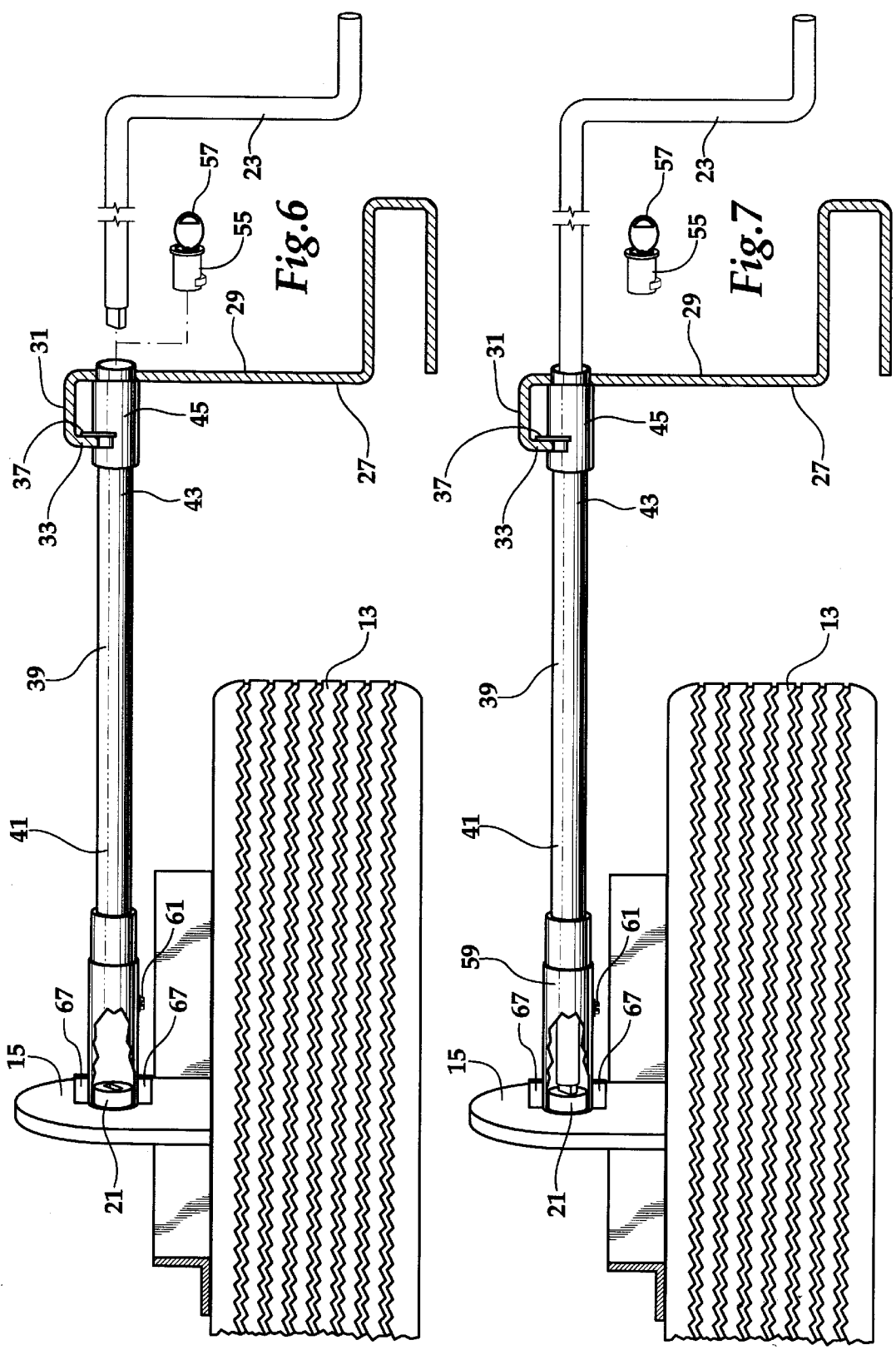

SPARE TIRE LOCKING DEVICE

BACKGROUND OF THE INVENTION

1. Field of the Invention

This invention relates in general to security devices for securing spare tires. In particular, the invention relates to security devices for securing a spare tire mounted on a hoist having a hoist shaft accessible through an opening in the rear bumper of the pickup.

2. Description of Related Art

U.S. Pat. No. 5,199,287, issued Apr. 6, 1993, to McClary, shows a device for securing a spare tire mounted on a hoist having a hoist shaft accessible through an opening in the bumper. The device includes a locking shaft extending from the end of the hoist shaft to the opening in the bumper. The device also has a padlock inserted through a hole in the locking shaft for preventing the removal of the locking shaft from the hoist shaft.

U.S. Pat. No. 4,988,023, issued Jan. 29, 1991, to Heathcoat, discloses another device for securing a spare tire. The device includes a drive member that is permanently inserted into the end of the hoist shaft. The rear end of the drive member has a hexagonal shape to be engaged by a crank. The hexagonal end of the drive member can be covered by a removable cap that can be locked to the drive member with a key, thus preventing access to the drive member.

U.S. Pat. No. 5,638,711, issued Jun. 17, 1997, to Schotthoefer, discloses a device for securing a spare tire, in which the device includes a winch tube cover, a rear connector, and a lock for blocking access to the winch shaft. The bumper shown in this patent has a vertical portion and a horizontal portion extending forward from the vertical portion. The bumper does not have a lip extending downward from the horizontal portion.

SUMMARY OF THE INVENTION

The general object of the locking device of the invention is to prevent the unauthorized removal of a spare tire mounted on a hoist shaft under the rear of a truck. In particular, the object of the invention is to prevent unauthorized rotation of the hoist shaft. The invention is specifically designed to be used with Ford trucks, in which the rear bumper of the truck has a lip extending downward from a horizontal portion that extends forward from a vertical portion of the bumper.

This object is accomplished by a locking device having a winch tube cover, a forward connector attached to the forward end of the winch tube cover, a rear connector attached to the rearward end of the winch tube cover, and a lock. The forward connector is placed over the hoist shaft to allow access to the hoist shaft only through the winch tube cover. The rear connector extends through an opening in the rear bumper of the truck. The lock is temporarily secured to the rear connector to prevent access through the connector and the winch tube cover.

The above, as well as additional objects, features, and advantages of the invention will become apparent in the following detailed description.

BRIEF DESCRIPTION OF THE DRAWINGS

FIG. 1 is a perspective view of the device of the invention, mounted on the rear end of a truck having a spare tire mounted on a hoist of the type having a hoist shaft accessible through an opening in the rear bumper of the pickup. The truck is shown in shadow for clarity.

FIG. 2 is an exploded top plan view of the invention, removed from the truck.

FIG. 3 is a top plan view of the invention, installed on a truck.

FIG. 4 is a left side elevation of the invention, as the invention is being installed.

FIG. 5 is a left side elevation of the invention, with the lock in pace to prevent access to the hoist shaft.

FIG. 6 is a left side elevation of the invention, with the lock removed to all access to the hoist shaft.

FIG. 7 is a left side elevation of the invention, with the lock removed and with a crank inserted through the invention to engage the hoist shaft.

DESCRIPTION OF THE PREFERRED EMBODIMENT

The locking device of the invention is designed to work with a typical Ford pickup truck 11 of recent design. The truck 11 has a spare tire 13, suspended from a hoist 15 on a retainer 17 on the lower end of a cable 19. The hoist 15 has a hoist shaft 21—shown in FIGS. 4, 6, and 7—that is rotated in order to raise and lower the cable 19. The hoist shaft 21 is normally rotated using a crank 23. The crank 23 must be inserted through a hole 25 in the rear bumper 27 of the truck 11 in order to reach the hoist shaft 21.

As shown in the drawings, the rear bumper 27 of the truck 11 has vertical portion 29 and a horizontal portion 31. The horizontal portion 31 extends forward from the upper edge of the vertical portion 29. A lip 33 extends downward from the forward edge of the horizontal portion 31 of the bumper 27. In order to accommodate the crank 23, the vertical portion 29 of the bumper 27 has a circular hole 25 with a diameter that is larger than the crank 23. The lip 33 has an arcuate notch 37 to allow the crank 23 to pass under the lip 33.

The device of the invention includes a winch tube cover 39 that is tubular steel, and has a forward end 41 and a rearward end 43. The inner diameter of the winch tube cover 39 must be large enough to allow the crank 23 to pass through. The winch tube cover 39 is several feet long, extending from near the rear bumper 27 to within a few inches of the hoist 15.

A rear connector 45 is attached to the rearward end 43 of the winch tube cover 39. The rear connector 45 has an inner diameter larger than the outer diameter of the winch tube cover 39, so that the rearward end 43 of the winch tube cover 39 can be inserted into the rear connector 45.

The rear connector 45 has a first portion 47, with a diameter small enough to fit within the hole 25 in the bumper 27, and a second portion 49, with a diameter too large to pass through the hole 25 in the bumper 27. The second portion 49 also has a slot 51 that allows the lip 33 of the bumper 27 to fit within the slot 51, with the winch tube cover 39 passing through the notch 37 in the lip 33. The rear connector 45 also has a retaining plate 53 attached to the second portion 49 of the rear connector 45 adjacent to the slot 51 and extending upward behind the lip 33 of the bumper 27.

A lock 55 is attached to the rear connector 45 to prevent access to the hoist shaft 21 through the rear connector 45. The lock 55 may locked and unlocked using a key 57.

A forward connector 59 is attached to the forward end 41 of the winch tube cover 39 and covers one end of the hoist shaft 21. The forward connector 59 has an open bore to provide access to the hoist shaft 21. The inner diameter of the forward connector 59 is larger than the outer diameter of the winch tube cover 39 so the forward end 41 of the winch tube cover 39 can be inserted into the forward connector 59.

A set screw 61 on the forward connector 59 allows the connection between the forward connector 59 and the winch tube cover 39 to be adjusted. The set screw 61 passes through an elongate slot 63 in the forward connector 59 into a threaded hole in the forward end 41 of the winch tube cover 39. This adjustment is necessary because of the differences between various trucks on which the device may be used. The forward connector 59 also has a pair of slits 65 that engage a pair of flanges 67 on the hoist 15.

The installation and use of the invention is illustrated in FIGS. 4–7. As shown in FIG. 4, the device is first held at an angle, and the rear connector 45 is inserted into the hole 25 in the bumper 27. When the rear connector 45 is in the hole 25, the device is straightened to horizontal, as shown in FIG. 5. This places the retaining plate 53 behind the lip 33 of the bumper 27.

The forward connector 59 is then extended toward the hoist 15 to cover the hoist shaft 21. Once the device is the proper length, the set screw 61 is tightened to hold the device in place.

As shown in FIGS. 6 and 7, the key 57 can then be inserted into the lock 55, and the lock 55 can be removed from the rear connector 45. The crank 23 can then be inserted through the winch tube cover 39 to engage the hoist shaft 21.

The locking device of the invention has several advantages over the prior art. The winch tube cover 39 allows access to the hoist shaft 21 only through the winch tube cover 39, and the lock 55 prevents unauthorized access through the winch tube cover 39. Also, the locking device of the invention is inexpensive and the lock 55 is easy to install and to remove. The rear connector 45 cooperates with the lip 33 on the bumper 27 to provide a secure, steady locking device.

The invention has been described in only one embodiment. It should be apparent to those skilled in the art that the invention is not so limited, but is susceptible to various changes and modifications without departing from the spirit of the invention.

I claim:

1. A device for locking a spare tire mounted on a hoist having a hoist shaft, wherein the device comprises:

a rear bumper having a vertical portion with a hole providing access to the hoist shaft, a horizontal portion attached to the vertical portion and extending forward, and a lip extending downward from the horizontal portion, wherein the lip of the bumper has a arcuate notch aligned with the hole in the vertical portion of the bumper and the hoist shaft;

a winch tube cover, having a forward end and a rearward end;

a forward connector attached to the forward end of the winch tube cover and adapted to cover one end of the hoist shaft, and having an open bore to provide access to the hoist shaft;

a rear connector attached to the rearward end of the winch tube cover and adapted to extend through the opening in the rear bumper, and having an open bore to provide access to the hoist shaft; and a lock for temporary attachment to the rear connector to prevent access to the hoist shaft through the rear connector.

2. A device as recited in claim 1, wherein the rear connector has a first portion, with a diameter small enough to fit within the hole in the bumper, and a second portion, with a diameter too large to pass through the hole in the bumper, wherein the second portion also has a slot adapted to allow the lip of the bumper to fit within the slot with the winch tube cover passing through the notch in the lip.

3. A device as recited in claim 2, wherein the rear connector further comprises a retaining plate attached to the second portion of the rear connector adjacent to the slot and extending upward behind the lip of the bumper.

4. A device as recited in claim 3, wherein the forward connector further comprises a set screw for adjusting the overall length of the device.

5. A device as recited in claim 4, wherein the forward connector has a pair of slits adapted to engage a pair of flanges on the hoist.

* * * * *